United States Patent
Kim et al.

(10) Patent No.: US 7,746,968 B2
(45) Date of Patent: Jun. 29, 2010

(54) BEAM COMBINING AND HYBRID BEAM SELECTION METHOD FOR IMPROVING DIGITAL BROADCASTING RECEPTION PERFORMANCE, AND DIGITAL BROADCASTING RECEIVING APPARATUS USING THE SAME

(75) Inventors: Ju-Yeun Kim, Daegu (KR); Young-Su Kim, Daejeon (KR); Jae-Hwui Bae, Daejeon (KR); Hyun Lee, Daejeon (KR); Jong-Soo Lim, Daejeon (KR); Soo-In Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 564 days.

(21) Appl. No.: 11/722,036

(22) PCT Filed: Jul. 4, 2005

(86) PCT No.: PCT/KR2005/002117

§ 371 (c)(1),
(2), (4) Date: Jun. 18, 2007

(87) PCT Pub. No.: WO2006/065011

PCT Pub. Date: Jun. 22, 2006

(65) Prior Publication Data

US 2008/0092194 A1    Apr. 17, 2008

(30) Foreign Application Priority Data

Dec. 17, 2004    (KR) .................... 10-2004-0108298

(51) Int. Cl.
*H04B 7/10* (2006.01)
(52) U.S. Cl. .................................................... 375/347
(58) Field of Classification Search ............. 375/347
See application file for complete search history.

(56) References Cited

U.S. PATENT DOCUMENTS 6,249,251 B1 * 6/2001 Chang et al. ................. 342/378

(Continued)

FOREIGN PATENT DOCUMENTS

KR    1020020049358    6/2002

(Continued)

OTHER PUBLICATIONS

Moon, et al.; "Spatial Diversity Technique for Improvement of DTV Reception Performance"; IEEE Transactions on Consumer Electronics; vol. 49, No. 4; pp. 958-964; Nov. 2003.

(Continued)

*Primary Examiner*—Kevin Y Kim
(74) *Attorney, Agent, or Firm*—Jae Y. Park; Kile Goekjian Reed & McManus

(57) ABSTRACT

Provided are a beam combining and hybrid beam selection method that can improve digital broadcasting reception performance by combining more than two beam output signals (beam combination type) instead of simply selecting one of beam output signals (beam selection type), or even selecting an optimal method between the beam selection type and the beam combination type, and a digital broadcasting receiving apparatus using the same.

16 Claims, 13 Drawing Sheets

U.S. PATENT DOCUMENTS

| | | | |
|---|---|---|---|
| 7,095,814 B2 * | 8/2006 | Kyeong et al. | 375/347 |
| 7,315,589 B2 * | 1/2008 | Bae et al. | 375/343 |
| 7,339,979 B1 * | 3/2008 | Kelkar | 375/147 |
| 7,394,858 B2 * | 7/2008 | Sadowsky et al. | 375/260 |

FOREIGN PATENT DOCUMENTS

| | | |
|---|---|---|
| KR | 1020040027210 | 4/2004 |

OTHER PUBLICATIONS

Meehan; "Antenna Diversity For Improving Indoor Reception Of US Digital Terrestrial Television Receivers"; IEEE Transactions on Consumer Electronics; vol. 48, No. 4; pp. 850-853; Nov. 2002.

Kim, et al.; "ATSC Digital TV Receiver using Spatial Diversity Technique"; IEEE 60th Vehicular Technology Conference Fall 2004; vol. 1; pp. 310-313; Sep. 2004.

International Search Report dated Nov. 14, 2005 for Application No. PCT/KR2005/002117 (All references cited in Search Report are listed above).

* cited by examiner tap coefficient of equalizer tap coefficient of equalizer

BEAM COMBINING AND HYBRID BEAM SELECTION METHOD FOR IMPROVING DIGITAL BROADCASTING RECEPTION PERFORMANCE, AND DIGITAL BROADCASTING RECEIVING APPARATUS USING THE SAME

TECHNICAL FIELD

The present invention relates to a beam combining and hybrid beam selection method for improving digital broadcasting reception performance, and a digital broadcasting receiving apparatus using the same; and, more particularly, to a beam combining and hybrid beam selection method for improving digital broadcasting reception performance, and a digital broadcasting receiving apparatus using the same, in which more than two beam output signals instead of selecting one of beam output signals are combined (beam combination type), or an optimal method of a beam selection type or a beam combination type is selected.

BACKGROUND ART

Advanced Television Systems Committee (ATSC) digital TV (DTV) transmission scheme can transmit high quality of image at a high data rate, but is greatly dependent on multipath signals with large amplitude or characteristics of Doppler shift. Therefore, in poor channel environments, such as indoor reception environment or mobile reception environment, an equalizer of a DTV receiver does not completely compensate for channel distortion, thus greatly degrading reception performance. To solve this limitation, channel distortion that must be compensated by the equalizer is reduced by performing signal processing in spatial domain as well as time domain.

Conventional beamforming techniques that can achieve a spatial signal processing are classified into an adaptive beamforming signal processing and a selective beamforming signal processing.

The adaptive beamforming method calculates beamforming weight coefficients in real time and adaptively. On the contrary, the selective beamforming method forms several beams using weight coefficients fixed in a designated direction and selects a signal having the highest reception performance among several beam outputs. Consequently, the selective beamforming method can be implemented more easily than the adaptive beamforming method and has a high applicability to the DTV system.

That is, the selective beamforming method draws attraction because it can improve the reception performance in a relatively simple way by the combination with the DTV receiver. Regarding a received signal passing through the selective beamforming system, multipath signals are somewhat removed and then inputted to the DTV receiver. Therefore, the equalizer of the DTV receiver can compensate for the distorted channels in a relatively simple way.

However, since the conventional selective beamforming method also selects only one of several beam output signals, there exists the limitation in improving the reception performance. Therefore, there is a demand for calculating beams with channel characteristic improved much more than the selective beamforming method by selecting more than two beams satisfying a criteria condition of channel characteristic, instead of selecting only one beam output signal, and combining selected beam output signals.

DISCLOSURE

Technical Problem

It is, therefore, an object of the present invention to provide a beam combining and hybrid beam selection method that can improve digital broadcasting reception performance by combining more than two beam output signals (beam combination type) instead of simply selecting one of beam output signals (beam selection type), or even selecting an optimal method between the beam selection type and the beam combination type, and a digital broadcasting receiving apparatus using the same.

Other objects and advantages of the present invention can be understood more fully through the embodiments of the present invention. Also, the objects and advantages of the present invention can be easily implemented by means of the following claims and combination thereof.

Technical Solution

In accordance with one aspect of the present invention, there is provided a beam combining method in a digital broadcasting receiving apparatus, the beam combining method including the steps of: calculating SMNRs (mainpath signal to multipath signals and noise ratios) with respect to a plurality of beam output signals, formed according to directions from a plurality of antenna output signals whose phases are shifted depending on arrangement positions of array antennas, by using corresponding channel impulse responses; selecting a predetermined number of beam output signals according to values of the SMNRs by comparing the calculated SMNRs with respect to the respective beam output signals; calculating a delay time between mainpath signals of the selected beam output signals; and generating a combined beam output signal by combining the two beam output signals by adjusting the calculated delay time.

In accordance with another aspect of the present invention, there is provided a beam selecting method in a digital broadcasting receiving apparatus, the beam selecting method including the steps of: a) calculating SMNRs (mainpath signal to multipath signals and noise ratios) with respect to a plurality of beam output signals, formed according to directions from a plurality of antenna output signals whose phases are shifted depending on arrangement positions of array antennas, by using corresponding channel impulse responses; b) selecting a first predetermined number of beam output signals according to magnitudes of the SMNRs by comparing the calculated SMNRs with respect to the respective beam output signals; c) calculating a delay time between mainpath signals of the selected beam output signals, and generating a combined beam output signal by combining the two beam output signals by adjusting the calculated delay time; d) when the SMNR of the combined beam output signal is less than the maximal SMNR of the selected beam output signals, calculating an SDMR (mainpath signal to dominant multipath signal ratio) with respect to the respective beam output signals, and selecting a beam output signal having the greatest SDMR; and e) calculating an SMNR of the combined beam output signal using channel impulse response of the combined beam output signal, and comparing the calculated SMNR with a maximal value among the SMNRs of the selected beam output signals; and f) when the SMNR of the combined beam output signal is greater than or equal to the maximal SMNR of the selected output signals, selecting the combined beam output signal generated in step c).

In accordance with a further aspect of the present invention, there is provided a digital broadcasting receiving apparatus using beam combination, including: a plurality of RF front ends for converting RF signals, received through antenna elements of array antennas, into digital signals of IF band; a plurality of beamformers for forming different beams depending on directions by using the IF signals outputted from the RF front ends; a plurality of demodulators for demodulating the beam output signals of the beamformer into baseband signals of symbol unit; a plurality of correlators for generating channel impulse responses by correlating the output signals of the demodulators with a training sequence signal; a beam combiner for calculating SMNRs with respect to channel impulse responses generated from the correlators and generating a beam combined output signal by selecting and combining a predetermined number of beam output signals according to values of the SMNRs; and an equalizer for compensating for channel distortion in the output signal of the beam combiner.

In accordance with a still further another embodiment of the present invention, there is provided a digital broadcasting receiving apparatus using hybrid beam selection, including: a plurality of RF front ends for converting RF signals, received through antenna elements of array antennas, into digital signals of IF band; a plurality of beamformers for forming different beams depending on directions by using the IF signals outputted from the RF front ends; a plurality of demodulators for demodulating the beam output signals of the beamformer into baseband signals of symbol unit; a plurality of correlators for generating channel impulse responses by correlating the output signals of the demodulators with a training sequence signal; a hybrid beam selector for calculating first SMNR with respect to the respective channel impulse responses, generating a beam combined output signal by selecting and combining a predetermined number of beam output signals according to values of the first SMNRs, and performing one of a beam selecting method and a beam combining method by comparing a second SMNR calculated using a channel impulse response of the beam combined output signal with a maximal value of the first SMNRs; and an equalizer for compensating for channel distortion in the output signal of the beam combiner.

Advantageous Effects

In accordance with the present invention, performance of a DTV receiver can be improved in mobile reception and indoor reception environment by providing a beam combining method using a reliable beam selection.

Also, a beam combining method in accordance with the present invention can increase an equalization speed of a receiver and an output SNR by compensating for time delay alone without special signal processing with respect to beam outputs to be combined.

Further, a hybrid beam selecting method in accordance with the present invention can remarkably improve the performance of a receiver by selecting an optimal one of a beam selecting structure and a beam combining structure through comparison of channel impulse responses after beam combination, instead of selecting and combining beams.

DESCRIPTION OF DRAWINGS

The above and other objects and features of the present invention will become apparent from the following description of the preferred embodiments given in conjunction with the accompanying drawings, in which.

BEST MODE FOR THE INVENTION

Other objects and aspects of the invention will become apparent from the following description of the embodiments with reference to the accompanying drawings, which is set forth hereinafter.

Figure 1:
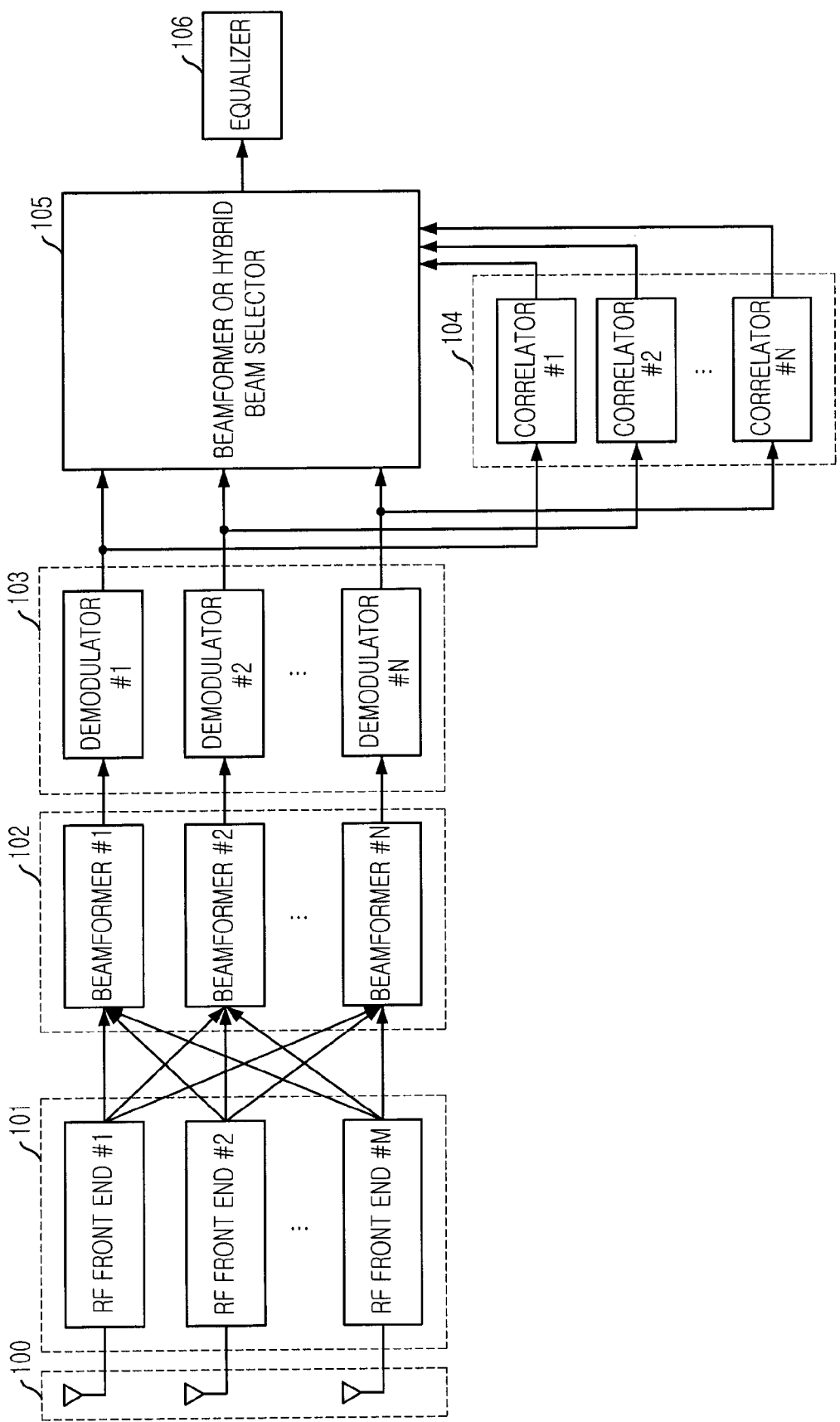
FIG. 1 is a block diagram of a beam combining type digital broadcasting receiving apparatus and a hybrid beam selecting type digital broadcasting receiving apparatus in accordance with an embodiment of the present invention.

FIG. 1 is a block diagram of a beam combining type digital broadcasting receiving apparatus and a hybrid beam selecting type digital broadcasting receiving apparatus in accordance with an embodiment of the present invention. One of a beam combiner or a hybrid beam selector 105 is used.

When the number of array antennas 100 and the direction and number of beam are determined, weight values based on the direction are determined. In FIG. 1, M represents the number of array antennas and N represents the number of the determined beam.

Signals inputted to the antenna elements are incident with different phase shifts according to positions of the antenna array. The signals incident onto the antennas pass through an RF front end 101 and finally produces digital signals of IF band.

N number of beamformers 101 form different beams according to the beam directions and receive output signals of M number of RF front ends 101. A demodulator 103 demodulates an output signal of the beamformer 102 into baseband signal of symbol unit.

In order to estimate channel impulse response, the output signal of the demodulator 104 passes through a correlator 104. The correlator 104 calculates the channel impulse response using a cross correlation between the output signal of the demodulator and a PN511 signal of a field segment. The PN511 signal of the field segment is a kind of a training sequence.

Figure 9:
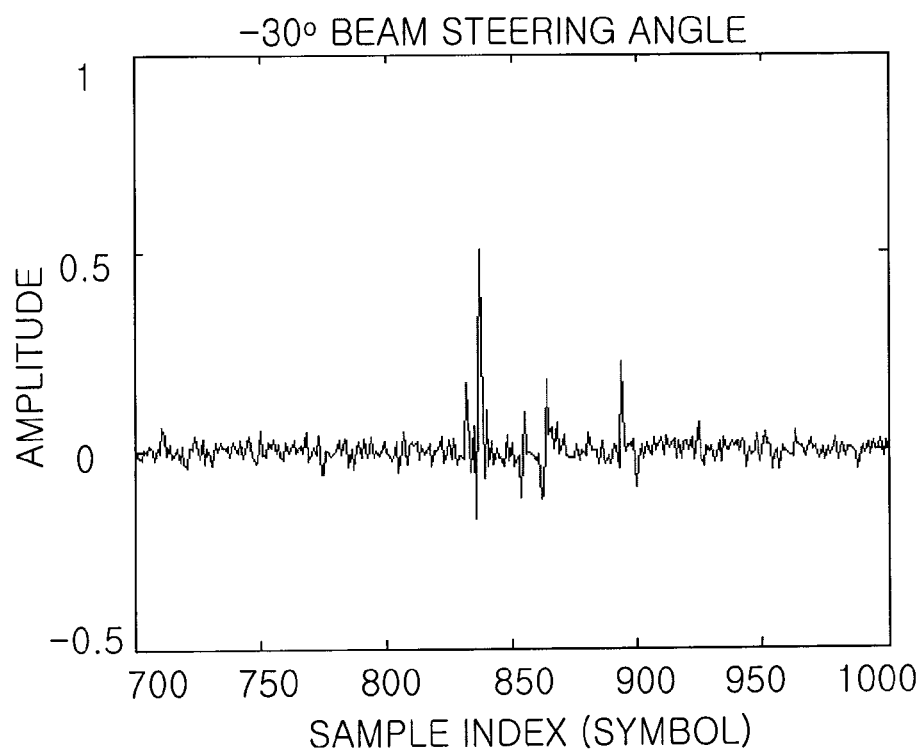
FIGS. 9 to 13 illustrate channel impulse responses of the beam outputs used in the beam combination of FIG. 8.
Figure 10:
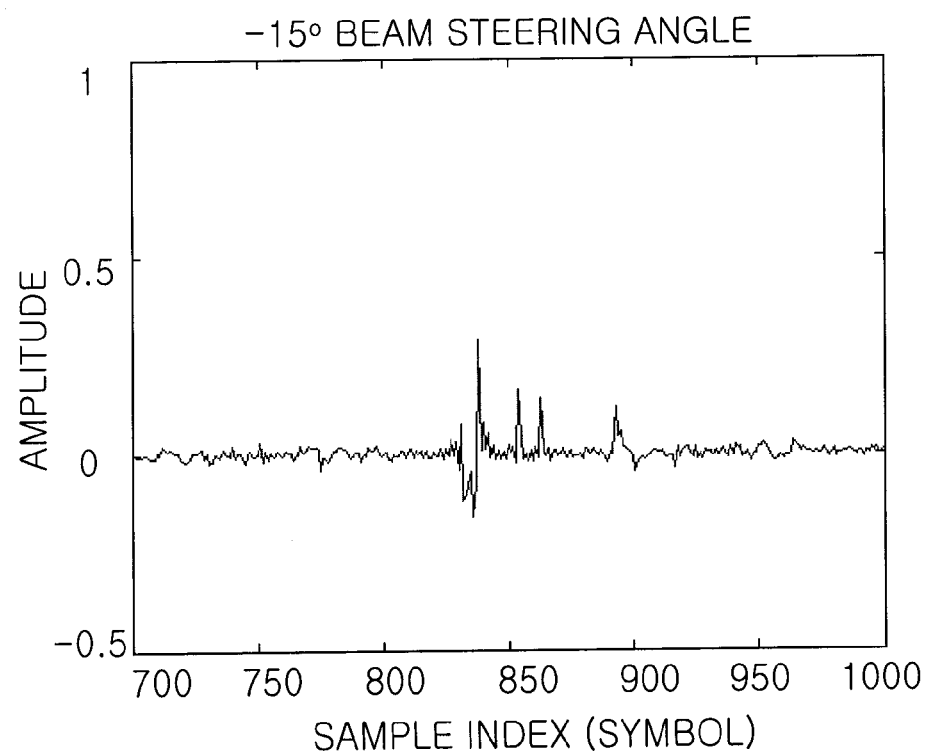

If an incident angle of a mainpath signal inputted to the antenna is 10° and incident angles of the remaining multipath signals are respectively −33°, −66°, 60°, 35° and 63°, channel impulse responses of five beam outputs are exhibited like FIGS. 9 and 10. They are output signals of the correlator 104.

If the output signals of N number of the correlators 104 are transferred to the beam combiner or hybrid beam selector 105, signals are combined/selected by the beam combiner or hybrid beam selector 105 and then inputted to an equalizer 106.

The equalizer 106 compensates for channel distortion remaining in the output signals of the beam comber or hybrid beam selector 105.

Figure 2:
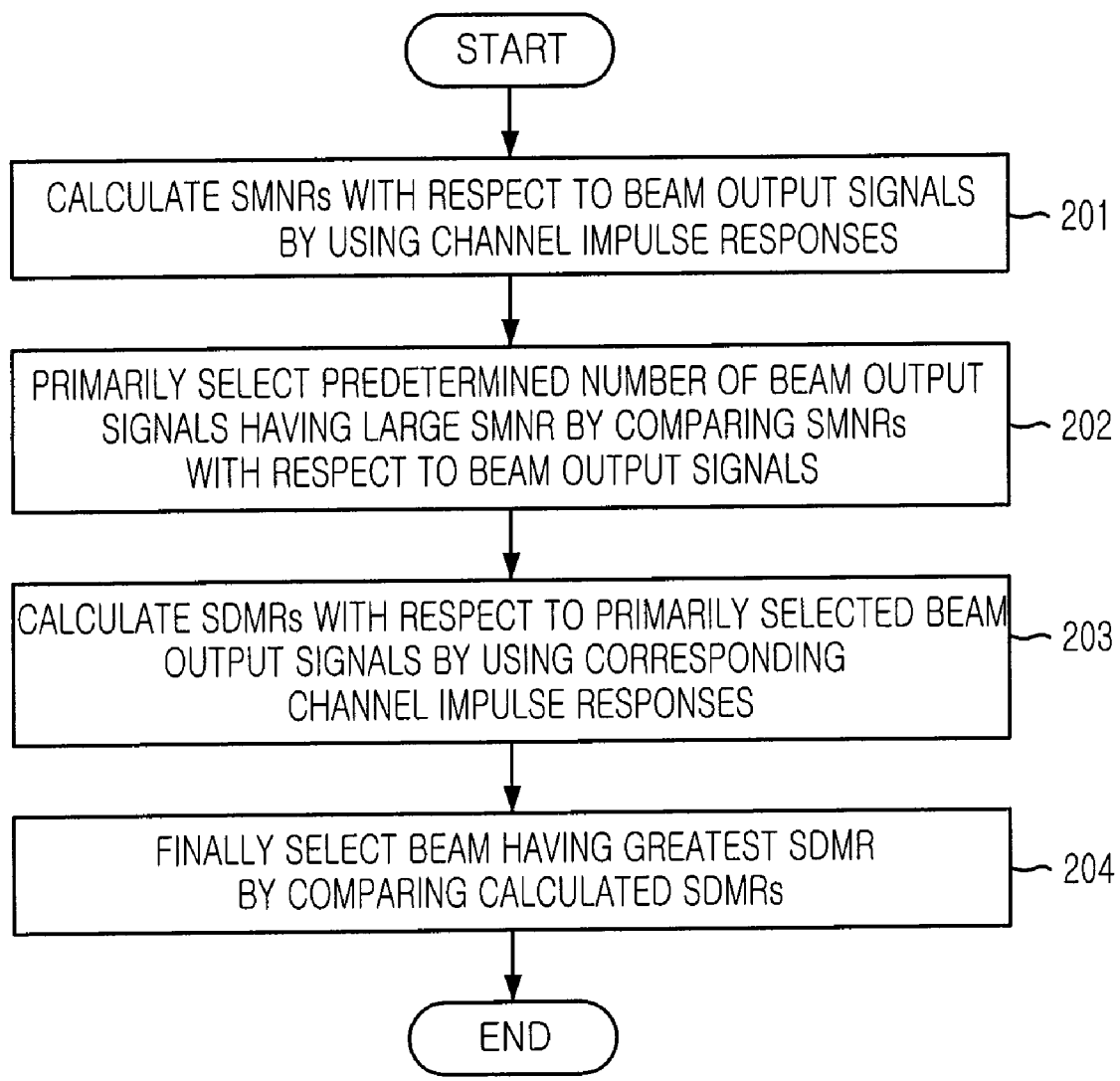
FIG. 2 is a flowchart of a beam selecting method in accordance with an embodiment of the present invention.

FIG. 2 is a flowchart of a beam selecting method in accordance with an embodiment of the present invention. The flowchart of FIG. 2 represents an algorithm for reliable beam selection that can most improve the reception performance among several beams. This method is carried out in the beam selector 105. That is, the beam selecting method is the beam selecting algorithm for transferring signals having less distortion to the equalizer 106 of the DTV receiver.

In accordance with this algorithm, characteristics of several beam output signals are examined, instead of one beam output signal. Then, a plurality of beam output signals are selected which have strong possibility of channel improvement in which multipath signals are much removed. Using these signals, channel improvement is maximized, thus improving the performance of the DTV receiver.

The beam selecting method is to select optimal beam using a mainpath signal to multipath signal and noise ratio (SMNR) and a mainpath signal to dominant multipath signal ratio (SDMR), which will be described below in detail.

In step 201, the beam selector 105 calculates SMNRs with respect to the respective beam output signals by using channel impulse responses estimated by the correlator 104. Specifically, as illustrated in FIGS. 3 to 7, the SMNRs are calculated under conditions that a signal 301 having the greatest amplitude is considered as a mainpath signal and the remaining signals 302 and 303 are considered as multipath signals and noises.

In step 202, using the SMNRs calculated in step 201, two or three beams having a large SMNR are primarily selected. The number of the primarily selected beams is determined by the number of beams that are applied to the DTV receiver. Here, the selected beams have the possibility that can improve the performance of the DTV receiver.

In step 203, SDMRs with respect to the primarily selected beam output signals are calculated using the corresponding channel impulse responses. That is, the SDMRs are calculated by the ratio of the mainpath signal to the multipath signal having the greatest amplitude. The comparison under this condition can be a process of checking the amplitude distribution of the multipath signals. When the SMNRs of the primarily selected beam output signals are similar to one another, if a beam output signal having one large multipath signal and beam output signals having several small multipath signals exist, the selection of the latter is excellent to the equalizer side in terms of the performance improvement. Step 204 is a process that considers this fact.

In step 204, the SDMRs are compared in the channel impulse responses of the two or three beam output signals selected primarily, and the beam output signal (output signal of the demodulator) having the greatest SDMR is finally selected.

FIGS. 3 to 7 illustrate channel impulse responses of the beam outputs according to beam steering angles used in the beam selecting method of FIG. 2.

Figure 3:
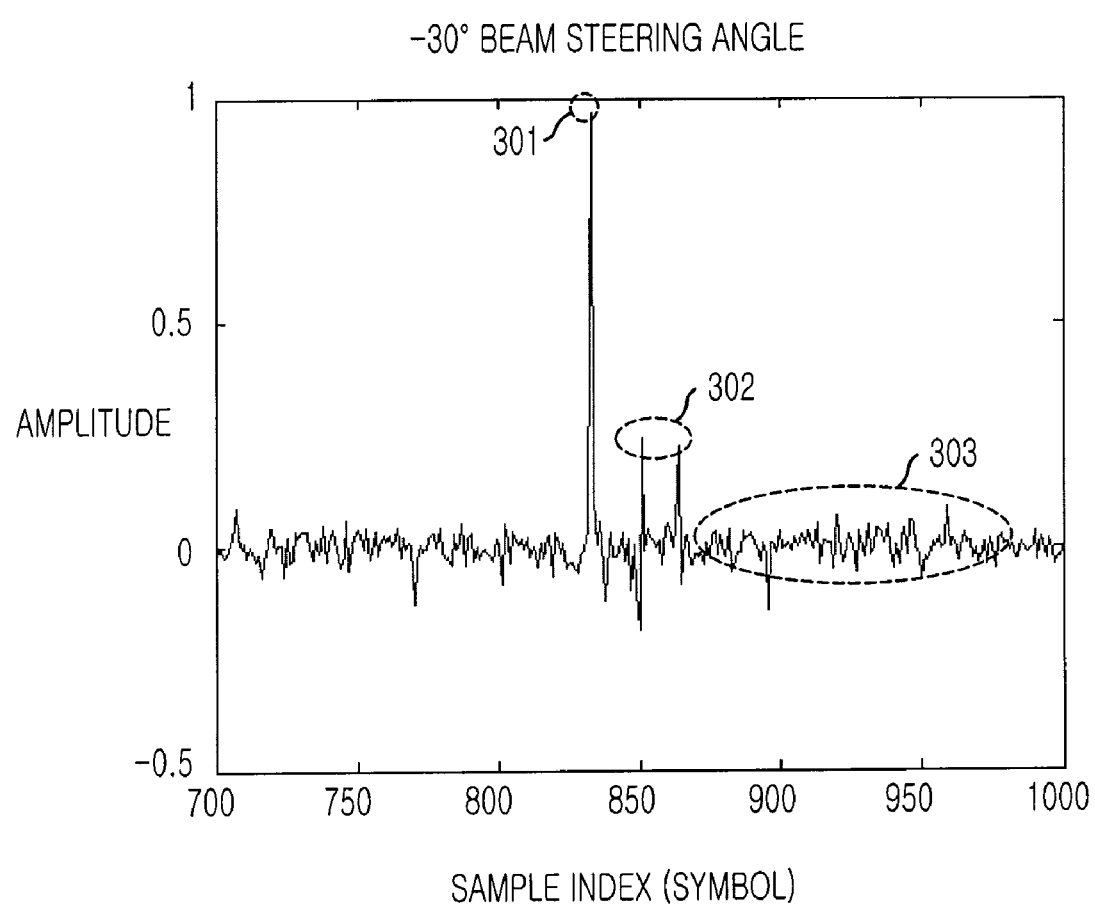
FIGS. 3 to 7 illustrate channel impulse responses of beam outputs according to steering angles of beams used in the beam selecting method of FIG. 2.
Figure 4:
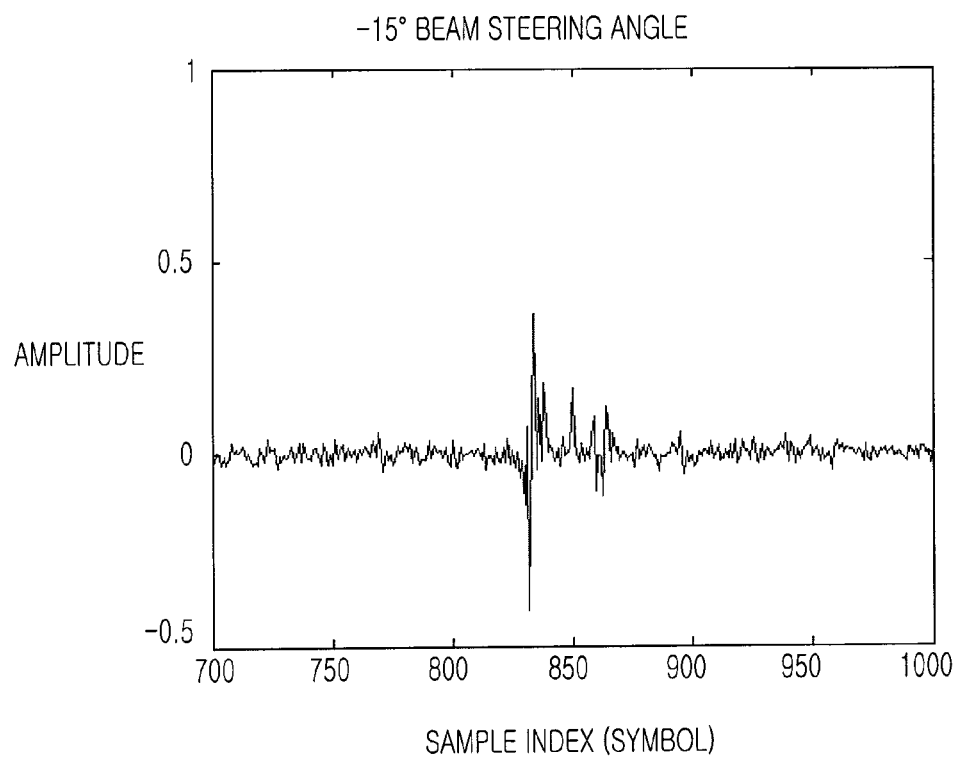
Figure 5:
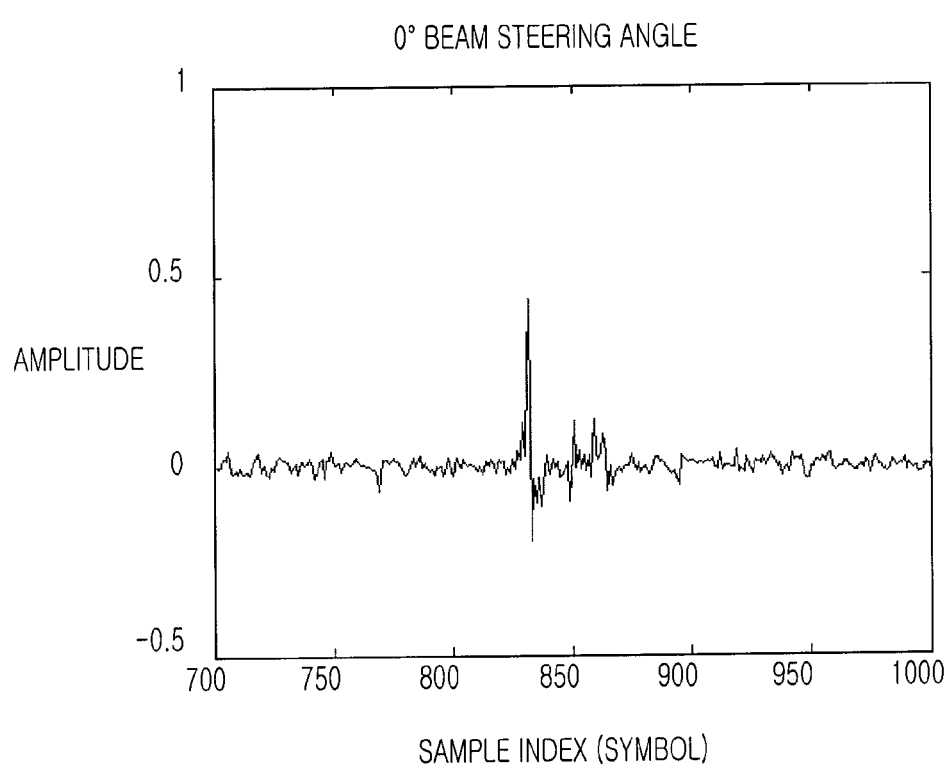
Figure 6:
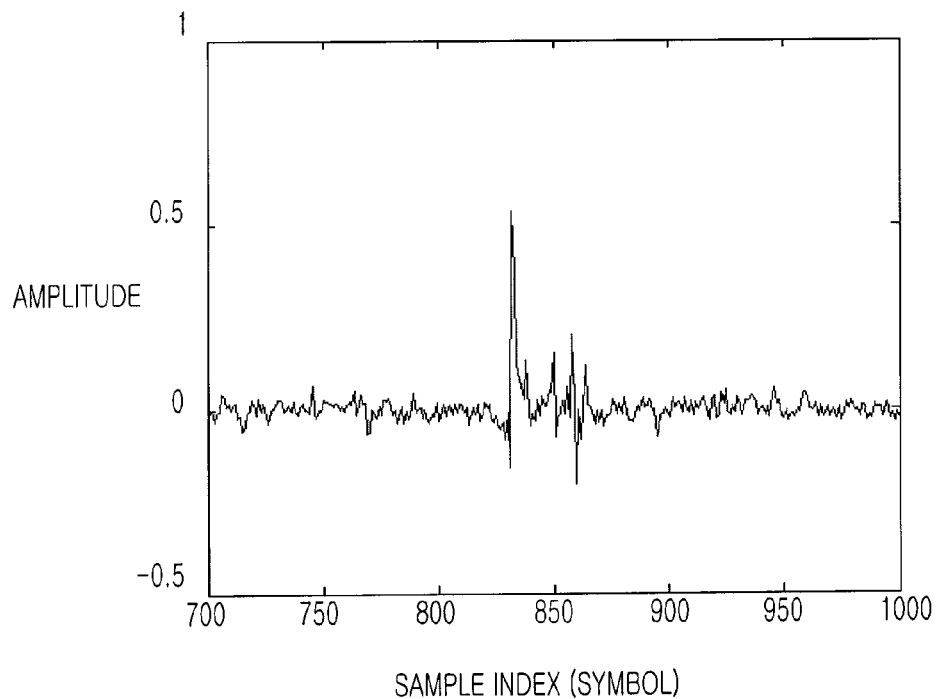
Figure 7:
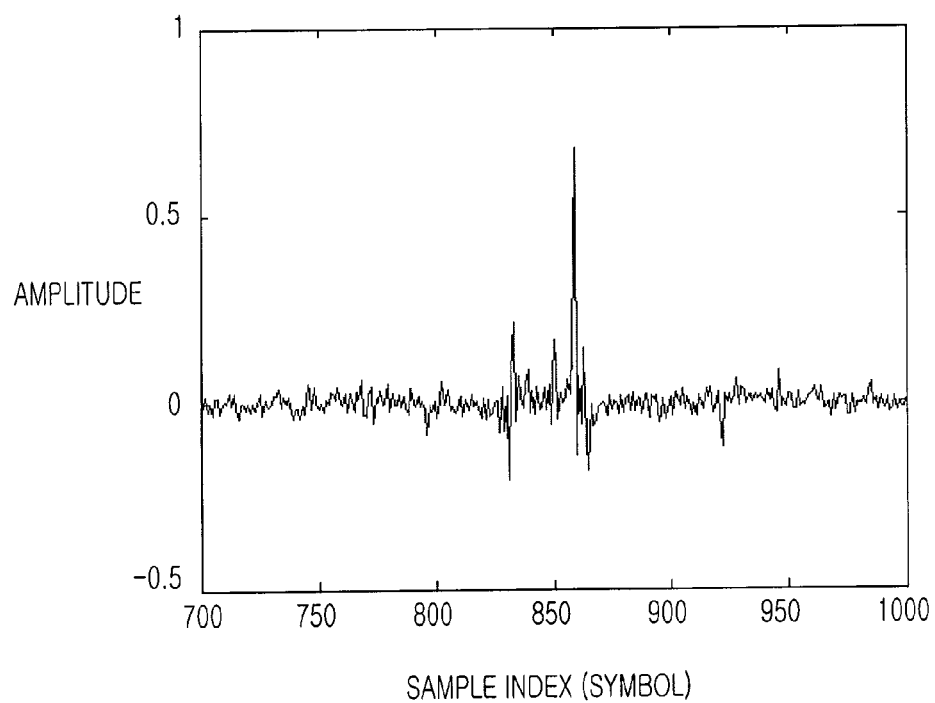

FIG. 3 illustrates a channel impulse response of a first beam output when a beam steering angle is −30°, FIG. 4 illustrates a channel impulse response of a second beam output when a beam steering angle is −15°, FIG. 5 illustrates a channel impulse response of a third beam output when a beam steering angle is 0°, FIG. 6 illustrates a channel impulse response of a fourth beam output when a beam steering angle is 15°, and FIG. 7 illustrates a channel impulse response of a fifth beam output when a beam steering angle is 30°.

In using the selection type method, channel impulse responses as illustrated in FIGS. 3 to 7 are primarily selected, and a channel impulse response as illustrated in FIG. 3 is finally selected according to application of a secondary selection condition.

Figure 8:
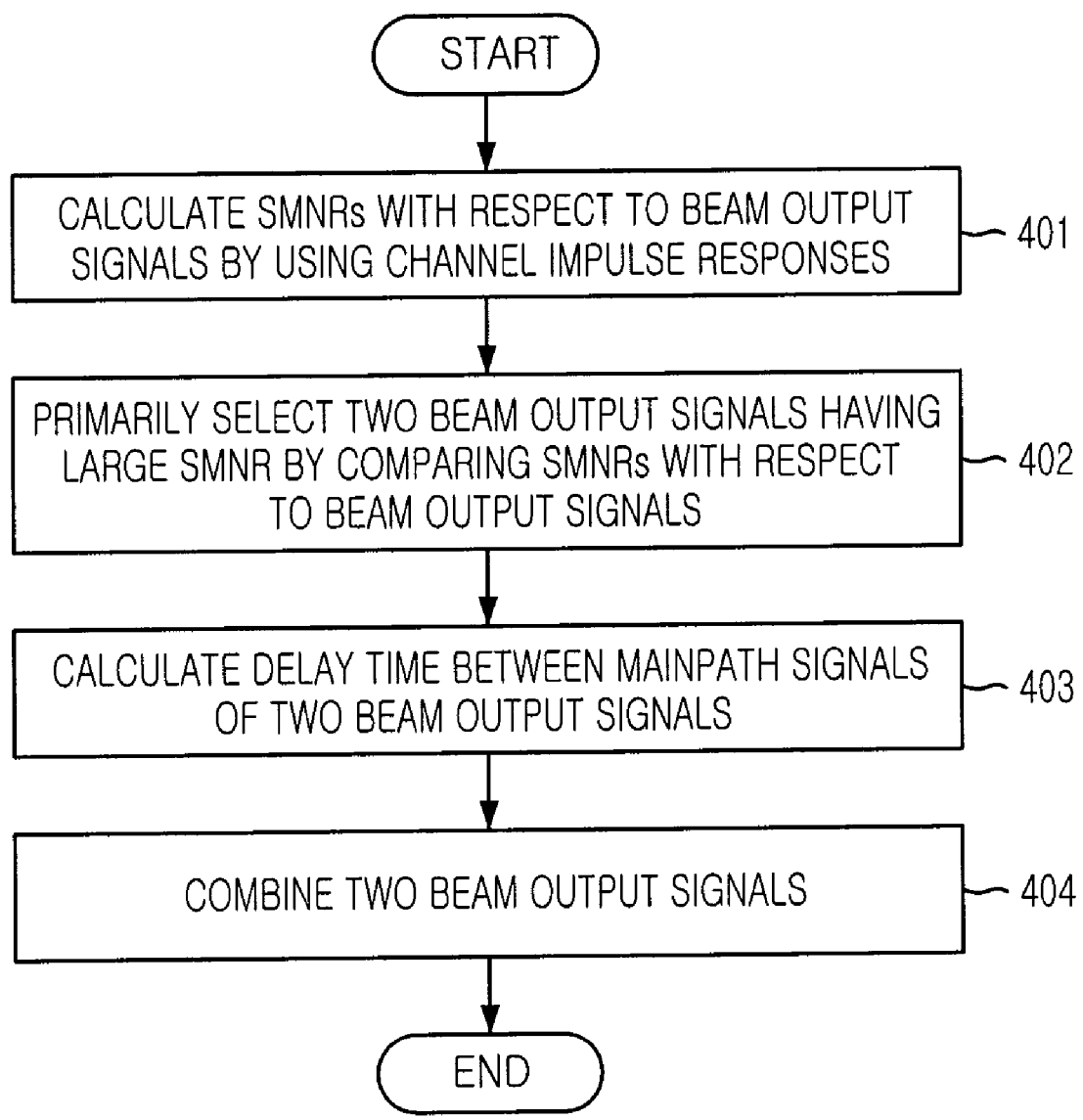
FIG. 8 is a flowchart of a beam combining method for improving a digital broadcasting reception performance in accordance with an embodiment of the present invention.

FIG. 8 is a flowchart of a beam combining method for improving a digital broadcasting reception performance in accordance with an embodiment of the present invention. The beam combining method is carried out in the beam combiner 105.

In step 401, the beam combiner 105 calculates SMNRs with respect to the respective beam output signals using channel impulse responses estimated by the correlator 104.

Figure 11:
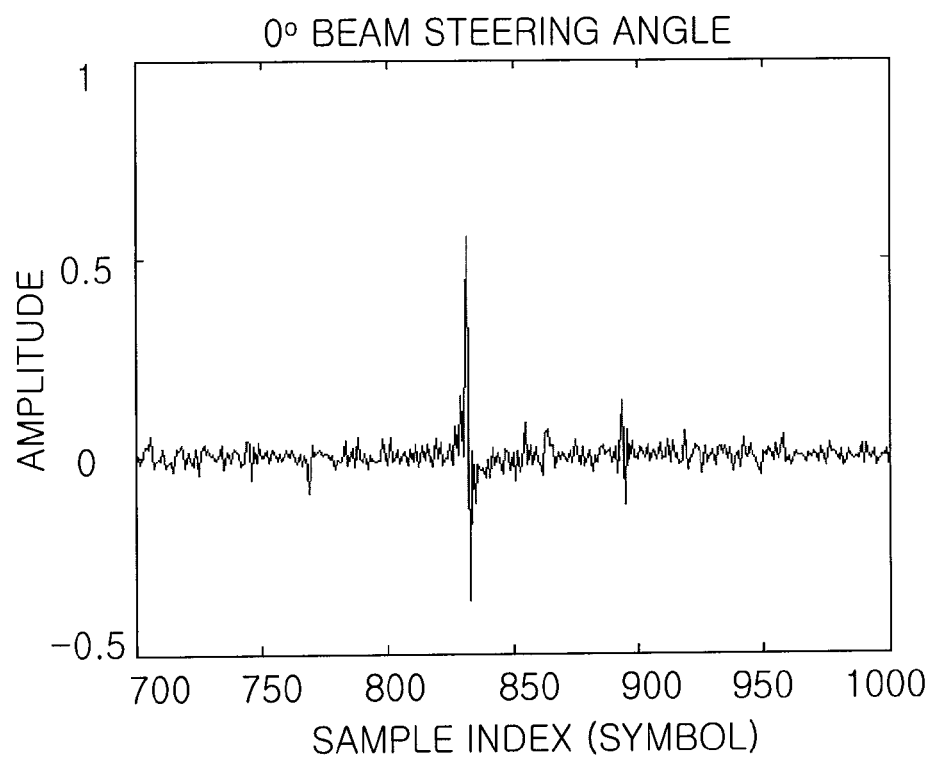
Figure 12:
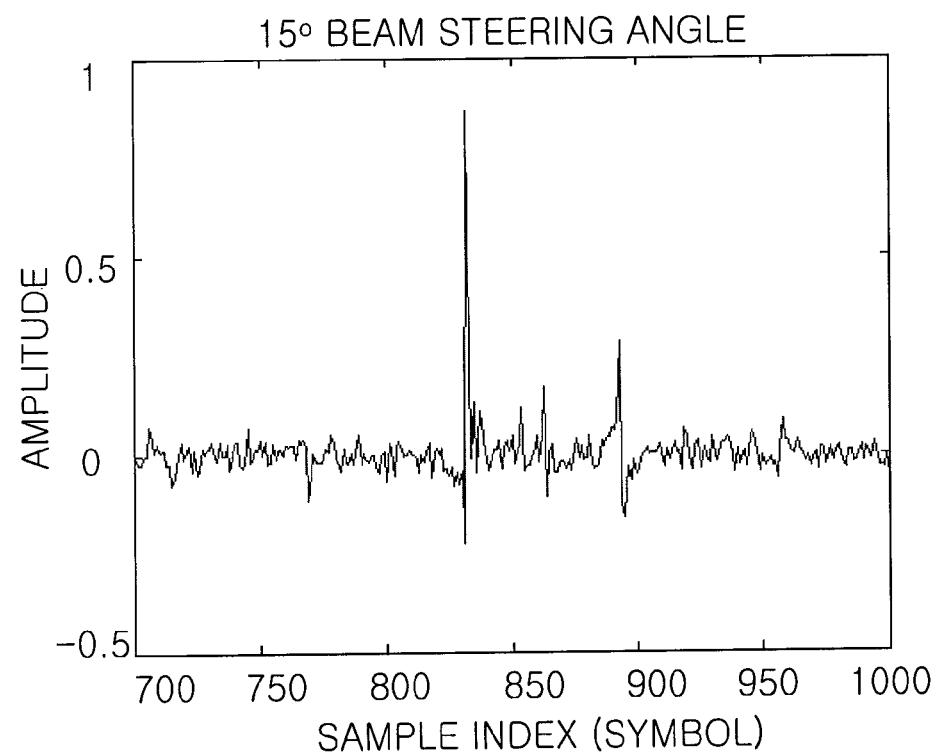
Figure 13:
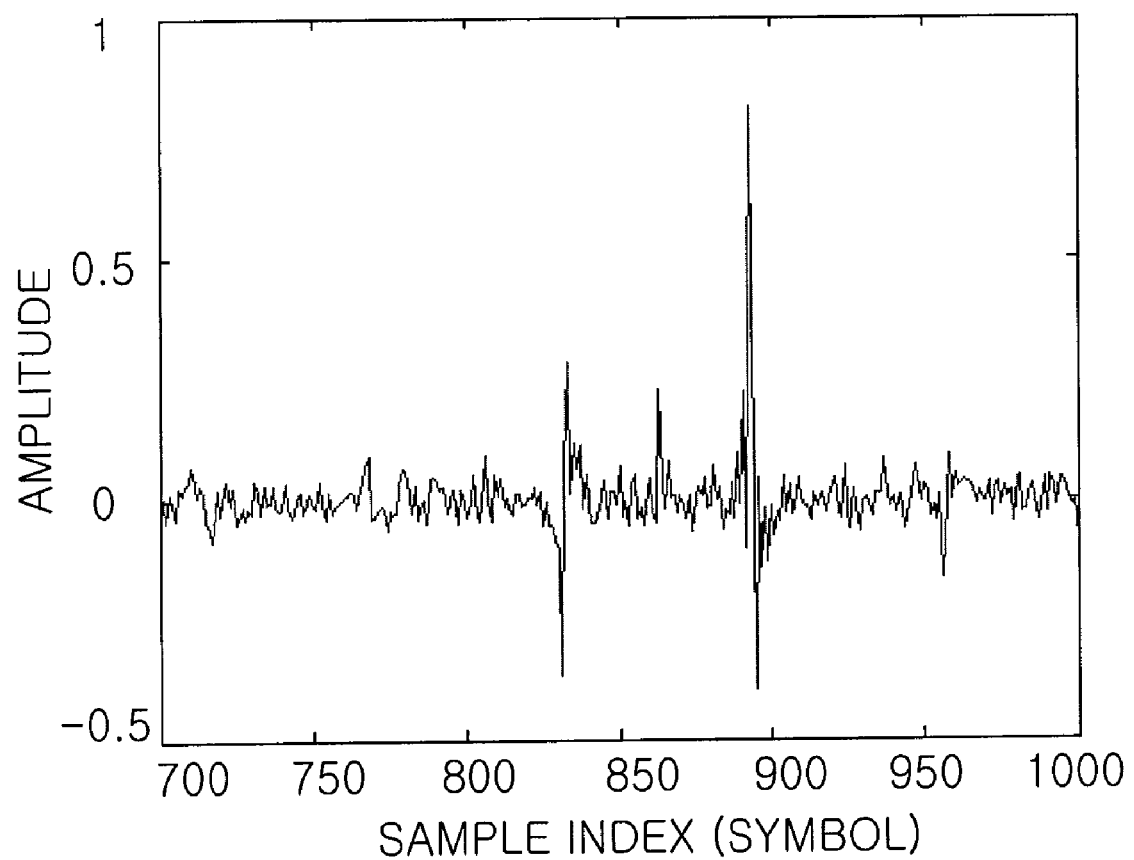

In step 402, using the SMNRs calculated in step 401, two beam output signals having a large SMNR are primarily selected. If an incident angle of a mainpath signal inputted to the antenna is 10° and incident angles of the remaining multipath signals are respectively −33°, −66°, 60°, 35° and 63°, channel impulse responses of five beam outputs are exhibited like FIGS. 9 and 13. FIG. 12 illustrates the channel impulse response having the greatest SMNR. From the five beam outputs under the above conditions of the incident angles, it can be seen that the cases of FIGS. 11 and 13 have small amplitudes of the multipath signals with respect to the mainpath signal. Therefore, if two beam output signals having a large SMNR are selected, the channel impulse responses of FIGS. 11 and 13 are sequentially selected. Using these results, a more excellent channel improvement effect can be obtained.

In step 403, a delay time between mainpath signals of the two beam output signals selected in step 401 are calculated. In step 404, two beam output signals are combined using the calculated delay time. When beam output results as illustrated in FIGS. 11 and 12 are added, a following process is required. Since two beams have different directions, signals that become mainpath signals in the respective beams have different time delays. Therefore, when adding two output signals, it is necessary to compensate for time difference of the mainpath signals. An equal gain combining (EGC) method or maximal ratio combining (MRC) method is used as the combining method.

FIGS. 9 to 13 illustrate channel impulse responses of the beam outputs used in the beam combination of FIG. 8, showing channel impulse responses of five beam outputs when the incident angel of the mainpath signal inputted to the antenna is 10° and the incident angles of the remaining multipath signals are respectively −33°, −66°, −60°, 35° and 63°.

Figure 14:
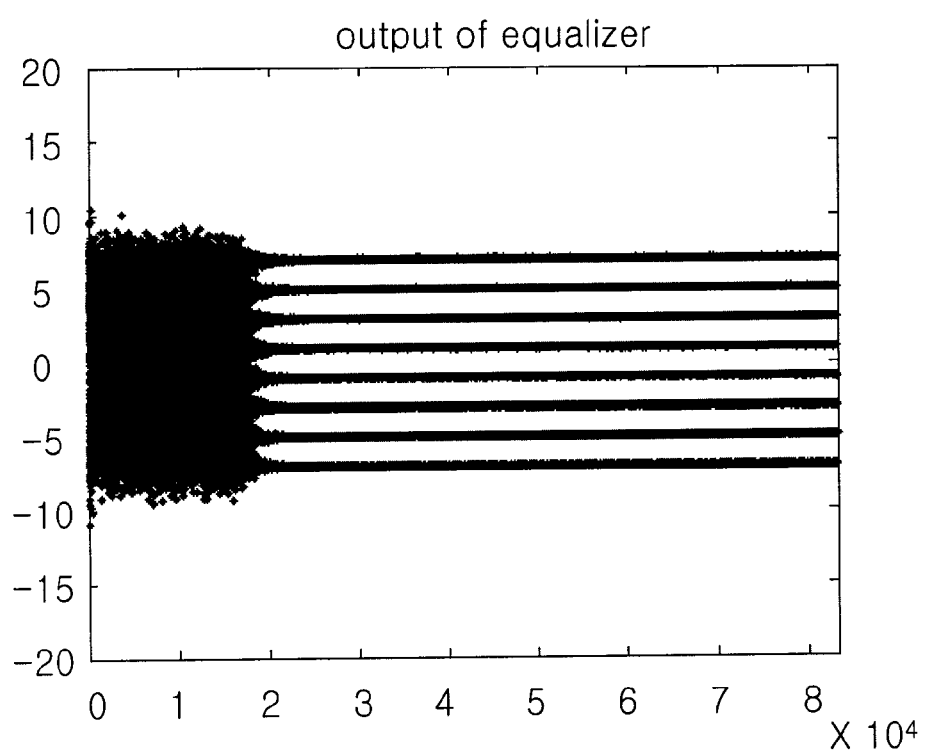
FIGS. 14 and 15 illustrates output signals of the equalizer in the beam selection type DTV receiving apparatus and the beam combination type DTV receiving apparatus, respectively.
Figure 15:
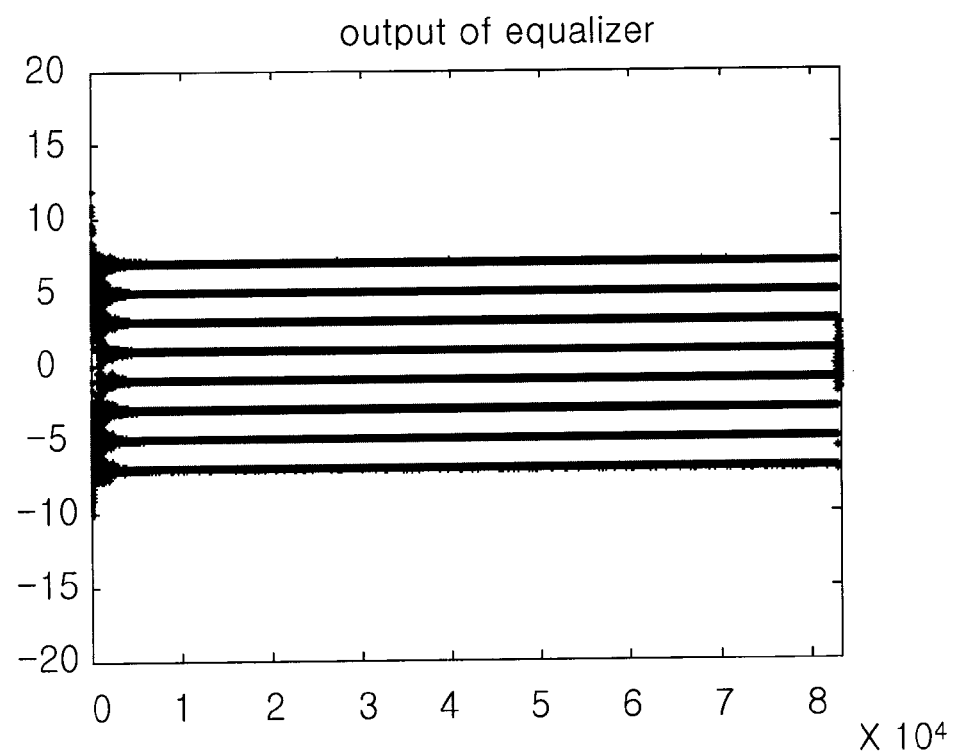
Figure 16:
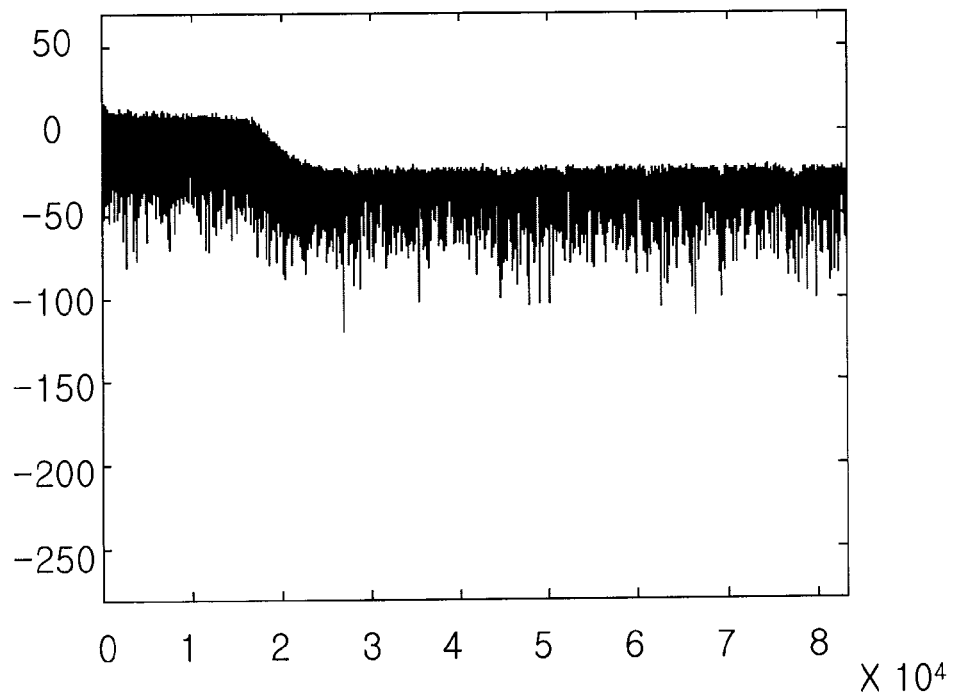
FIGS. 16 and 17 illustrates mean square error of the output signals of the equalizer in the beam selection type DTV receiving apparatus and the beam combination type DTV receiving apparatus, respectively.
Figure 17:
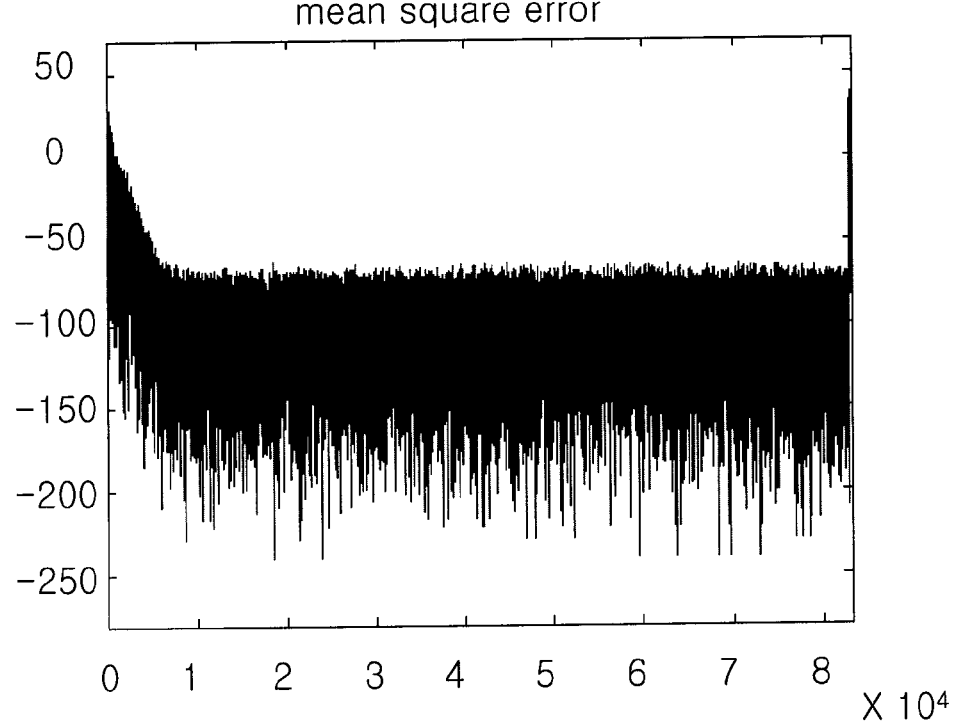
Figure 18:
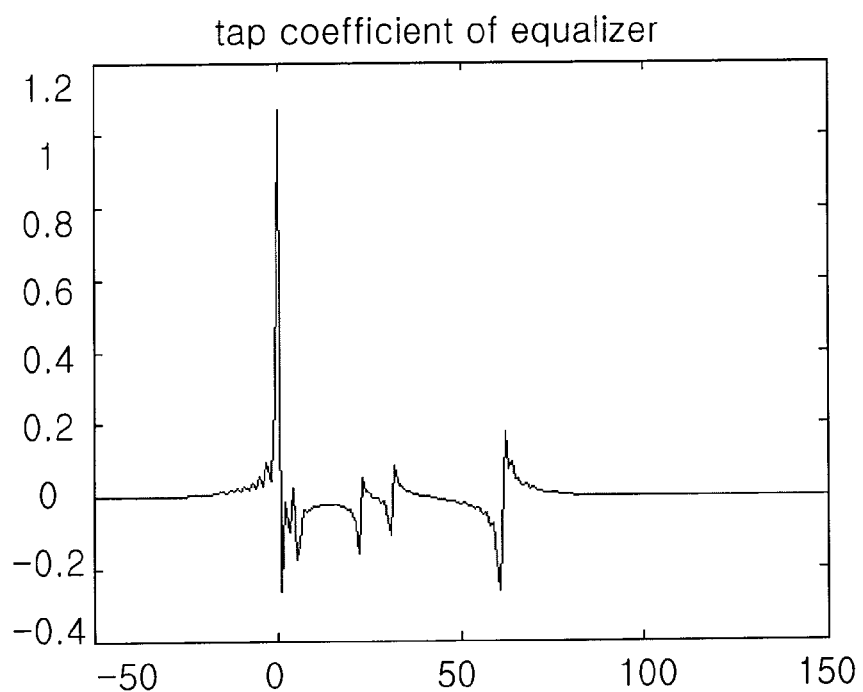
FIGS. 18 and 19 illustrate tap coefficients of the equalizer in the beam selection type DTV receiving apparatus and the beam combination type DTV receiving apparatus.
Figure 19:
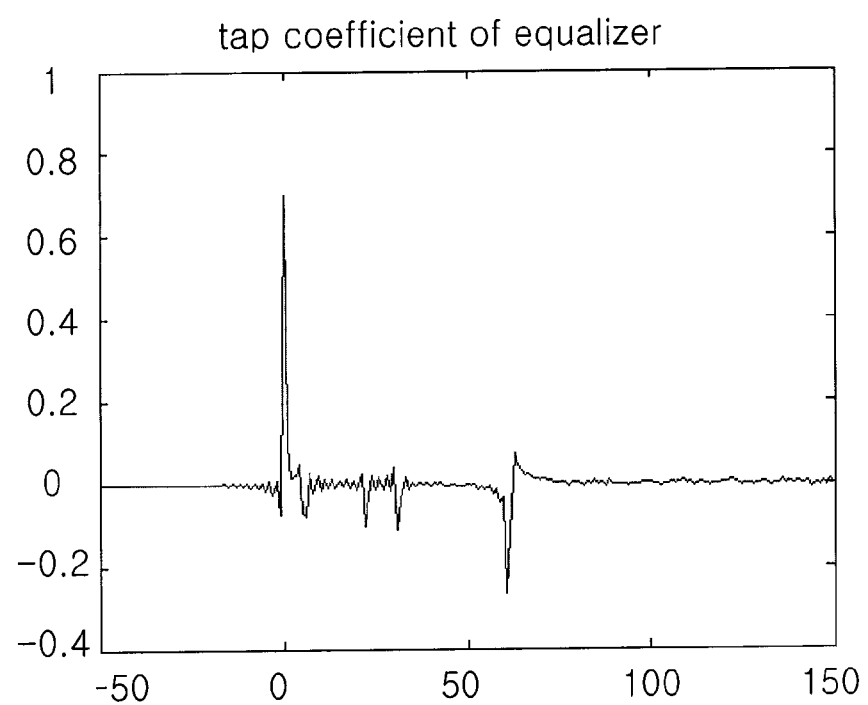

FIGS. 14 and 15 illustrates output signals of the equalizer in the beam selection type DTV receiving apparatus and the beam combination type DTV receiving apparatus, respectively. FIGS. 16 and 17 illustrates mean square error of the output signals of the equalizer in the beam selection type DTV receiving apparatus and the beam combination type DTV receiving apparatus, respectively. FIGS. 18 and 19 illustrate tap coefficients of the equalizer in the beam selection type DTV receiving apparatus and the beam combination type DTV receiving apparatus.

TABLE 1

| Channel | | InputSNR | | | | | | | | |
|---|---|---|---|---|---|---|---|---|---|---|
| | | 10 | 11 | 12 | 13 | 14 | 15 | 16 | 17 | 18 |
| Beam Selection | Osnr | 11.48 | 12.10 | 12.72 | 13.31 | 14.03 | 14.46 | 16.42 | 19.90 | 21.52 |
| | SER | 0.39 | 0.36 | 0.32 | 0.29 | 0.25 | 0.23 | 0.13 | 0.03 | 0.01 |
| Beam Combination | Osnr | 11.63 | 12.33 | 12.74 | 13.41 | 14.15 | 15.72 | 17.94 | 19.93 | 21.45 |
| | SER | 0.38 | 0.34 | 0.32 | 0.29 | 0.24 | 0.16 | 0.08 | 0.03 | 0.01 |

When comparing the performances of the beam selection type method and the beam combination type method under the above conditions, the results are given like FIGS. 14 to 19 and Table 1. Here, SER represents a symbol error rate and Oser represents an output SNR.

FIG. 14 illustrates an output signal of the equalizer when the beam selection type DTV receiving apparatus is used in Brazil D channel. A convergence speed and SNR state can be seen from FIG. 14. FIG. 15 illustrates an output signal of the equalizer when the beam combination type DTV receiving apparatus is used. It can be seen from FIGS. 14 and 15 that the beam combination type structure has a faster convergence speed than that of the beam selection type structure. Also, it can be seen from FIGS. 16 and 17 that the beam combination type structure has a higher output signal to noise ratio (SNR) after convergence than that of the beam selection type structure.

FIGS. 18 and 19 illustrate tap coefficients after convergence of the equalizer. In the equalizer tap coefficient of the receiving apparatus using the beam combination type structure, tap coefficient corresponding to position of the mainpath signal is reduced to less than 1. This reason is that the mainpath signal increases and the multipath signal decreases relatively due to the addition of the selected beam output signal. Therefore, the convergence speed of the equalizer becomes fast and the SNR of the output signal increases.

Table 1 shows the comparison analysis of performance when the beam selection type structure and the beam combination type structure are used. When the input SNR ranges from 10 dB to 18 dB, the beam combination type receiving apparatus has a high output SNR and a low SER.

However, the use of the beam combination type structure does not always help the performance improvement of the DTV receiving apparatus. Because the amplitude of the mainpath signal increases and the amplitude of the multipath signal decreases relatively when two beam output signals are added, the beam combination type structure can obtain more excellent performance than the beam selection type structure. That is, only when the mainpath signal to multipath signals ratios is increased or equal, the use of the beam combination type structure can improve the performance of the receiving apparatus. Therefore, the selection algorithm for determining which one of the beam selection type structure and the beam combination type structure will be used is important to improve the reception performance. Whichever structure is selected, the SMNR condition is used.

Figure 20:
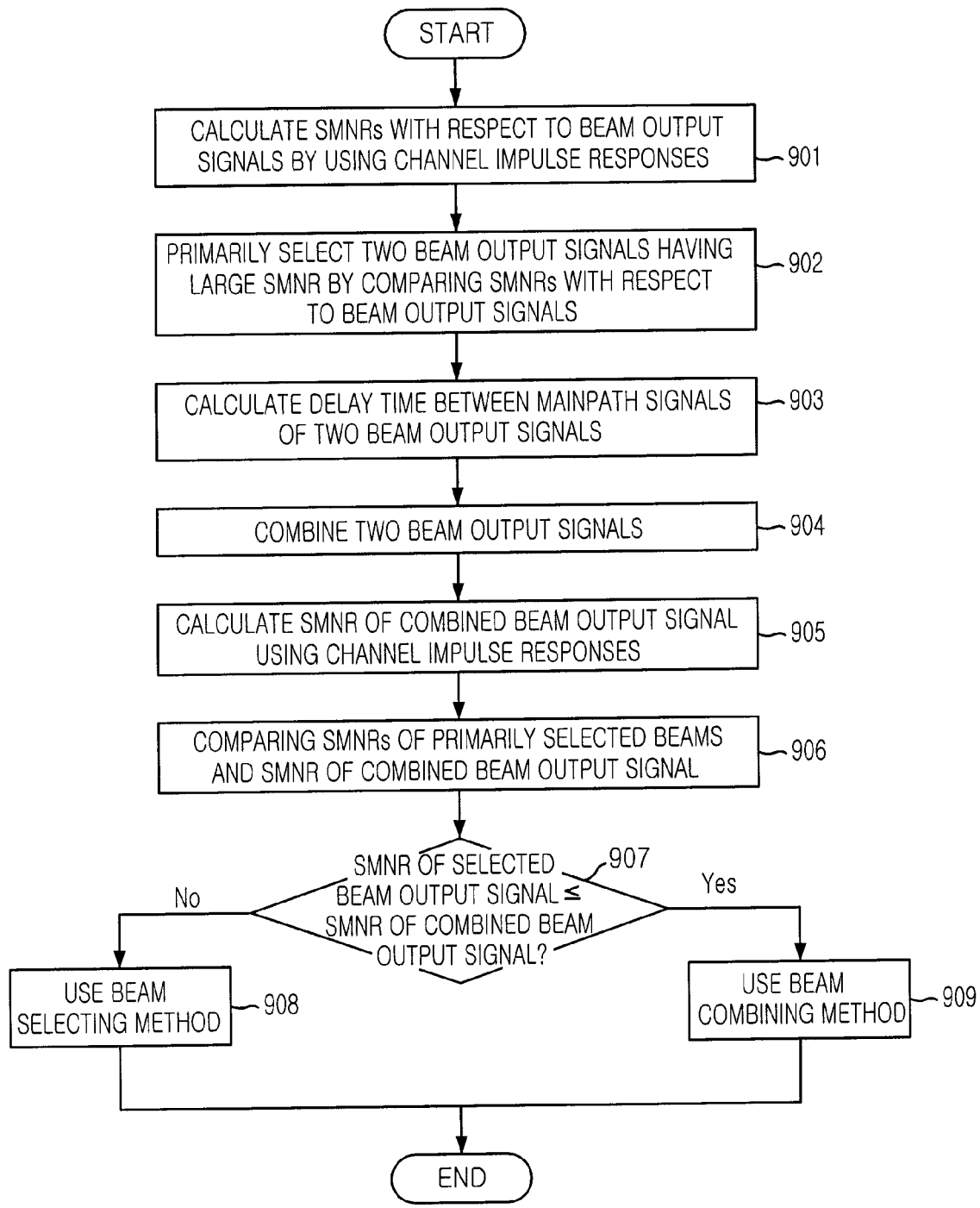
FIG. 20 is a flowchart of a hybrid beam selecting method for improving the digital broadcasting reception performance in accordance with an embodiment of the present invention.

FIG. 20 is a flowchart of a hybrid beam selecting method for improving the digital broadcasting reception performance in accordance with an embodiment of the present invention. The hybrid beam selecting method is carried out in the hybrid beam selector 105.

The present invention relates to a beam combining structure, capable of improving DTV reception performance, and a hybrid beam selecting method that selects one beam or combines more than two beam output signals depending on the conditions.

Referring to FIG. 20, in step 901, the hybrid beam selector 105 calculates SMNRs with respect to the respective beam output signals using channel impulse responses estimated by the correlator 104. In step 902, two beam output signals having a large SMNR are primarily selected using the SMNRs calculated in step 901. Specifically, as illustrated in FIGS. 9 to 13, the SMNRs are calculated under conditions that a signal having the greatest amplitude is considered as a mainpath signal and the remaining signals are considered as multipath signals and noises.

In step 903, a delay time (time difference) between mainpath signals of the two beam output signals selected in step 902 is calculated. In step 904, two beam output signals are combined adjusting the calculated delay time (that is, the time difference of the selected beam outputs is compensated and two signals are added).

In step 905, the SMNR is calculated using the channel impulse response of the combined beam output signals in step 904. In step 906, the calculated SMNR of step 905 is compared with the largest value among the SMNRs of the primarily selected beams of step 902. In step 907, it is determined whether the SMNR of the combined beam output signal is greater than or equal to the maximal SMNR of the selected beam output signal.

In step 908, when the maximal SMNR of the selected beam output signal is greater than the SMNR of the combined beam output signal, the beam is finally selected using the beam selecting method (see FIG. 2). The beam selecting method has been described above with reference to FIG. 2.

In step 909, when the SMNR of the combined beam output signal is greater than or equal to the maximal SMNR of the selected beam output signal, the beam combining method (FIG. 8) is used. That is, the combined signal obtained in step 904 is outputted to the equalizer.

The above-described methods in accordance with the present invention can be stored in computer-readable recording media. The computer-readable recording media may include CDROM, RAM, ROM, floppy disk, hard disk, optical magnetic disk, and so on. Since these procedures can be easily carried out by those skilled in the art, a detailed description thereof will be omitted.

While the present invention has been described with respect to certain preferred embodiments, it will be apparent to those skilled in the art that various changes and modifications may be made without departing from the scope of the invention as defined in the following claims.

What is claimed is:

1. A beam combining method in a digital broadcasting receiving apparatus, the beam combining method comprising the steps of:

calculating SMNRs (mainpath signal to multipath signals and noise ratios) with respect to a plurality of beam output signals, formed according to directions from a plurality of antenna output signals whose phases are shifted depending on arrangement positions of array antennas, by using corresponding channel impulse responses;

selecting a predetermined number of beam output signals according to values of the SMNRs by comparing the calculated SMNRs with respect to the respective beam output signals;

calculating a delay time between mainpath signals of the selected beam output signals; and generating a combined beam output signal by combining the two beam output signals by adjusting the calculated delay time.

2. The beam combining method as recited in claim 1, wherein the SMNRs are calculated under conditions that a signal having the greatest amplitude is considered as a mainpath signal and the remaining signals are considered as multipath signals and noises.

3. The beam combining method as recited in claim 2, wherein the two beam output signals are combined using an equal gain combining (EGC) method or a maximal ratio combining (MRC) method, and the delay time is compensated and added thereto.

4. A beam selecting method in a digital broadcasting receiving apparatus, the beam selecting method comprising the steps of:

a) calculating SMNRs (mainpath signal to multipath signal and noise ratios) with respect to a plurality of beam output signals, formed according to directions from a plurality of antenna output signals whose phases are shifted depending on arrangement positions of array antennas, by using corresponding channel impulse responses;

b) selecting a first predetermined number of beam output signals according to values of the SMNRs by comparing the calculated SMNRs with respect to the respective beam output signals;

c) calculating a delay time between mainpath signals of the selected beam output signals, and generating a combined beam output signal by combining the two beam output signals by adjusting the calculated delay time;

d) when the SMNR of the combined beam output signal is less than the maximal SMNR of the selected beam output signals, calculating an SDMR (mainpath signal to dominant multipath signal ratio) with respect to the respective beam output signals, and selecting a beam output signal having the greatest SDMR; and e) calculating an SMNR of the combined beam output signal using channel impulse response of the combined beam output signal, and comparing the calculated SMNR with a maximal value among the SMNRs of the selected beam output signals; and f) when the SMNR of the combined beam output signal is greater than or equal to the maximal SMNR of the selected output signals, selecting the combined beam output signal generated in step c).

5. The beam selecting method as recited in claim 4, wherein the step e) includes the steps of:

e1) selecting a predetermined number of beam output signals according to magnitudes of the SMNRs by comparing the calculated SMNRs with respect to the respective beam output signals;

e2) calculating SDMRs with respect to the beam output signals selected in the step e1) by using corresponding channel impulse responses; and e3) comparing the SDMRs calculated in the step e2) and selecting a beam output signal having the greatest SDMR.

6. The beam selecting method as recited in claim 5, wherein the SMNRs are calculated under conditions that a signal having the greatest amplitude is considered as a mainpath signal and the remaining signals are considered as multipath signals and noises.

7. The beam selecting method as recited in claim 6, wherein the two beam output signals are combined using an equal gain combining (EGC) method or a maximal ratio combining (MRC) method, and the delay time is compensated and added thereto.

8. A digital broadcasting receiving apparatus using beam combination, comprising:

a plurality of RF front ends for converting RF signals, received through antenna elements of array antennas, into digital signals of IF band;

a plurality of beamformers for forming different beams depending on directions by using the IF signals outputted from the RF front ends;

a plurality of demodulators for demodulating the beam output signals of the beamformer into baseband signals of symbol unit;

a plurality of correlators for generating channel impulse responses by correlating the output signals of the demodulators with a training sequence signal;

a beam combiner for calculating SMNRs with respect to channel impulse responses generated from the correlators and generating a beam combined output signal by selecting and combining a predetermined number of beam output signals according to magnitudes of the SMNRs; and an equalizer for compensating for channel distortion in the output signal of the beam combiner.

9. The digital broadcasting receiving apparatus as recited in claim 8, wherein the beam combiner performs a function of calculating SMNRs (mainpath signal to multipath signal and noise ratios) with respect to a plurality of beam output signals, formed according to directions from a plurality of antenna output signals whose phases are shifted depending on arrangement positions of array antennas, by using corresponding channel impulse responses; a function of selecting a predetermined number of beam output signals according to magnitudes of the SMNRs by comparing the calculated SMNRs with respect to the respective beam output signals; a function of calculating a delay time between mainpath signals of the selected beam output signals; and a function of generating a combined beam output signal by combining the two beam output signals by using the calculated delay time.

10. The digital broadcasting receiving apparatus as recited in claim 9, wherein the SMNRs are calculated under conditions that a signal having the greatest amplitude is considered as a mainpath signal and the remaining signals are considered as multipath signals and noises.

11. The digital broadcasting receiving apparatus as recited in claim 10, wherein the two beam output signals are combined using an equal gain combining (EGC) method or a maximal ratio combining (MRC) method, and the delay time is compensated and added thereto.

12. A digital broadcasting receiving apparatus using hybrid beam selection, comprising:

a plurality of RF front ends for converting RF signals, received through antenna elements of array antennas, into digital signals of IF band;

a plurality of beamformers for forming different beams depending on directions by using the IF signals outputted from the RF front ends;

a plurality of demodulators for demodulating the beam output signals of the beamformer into baseband signals of symbol unit;

a plurality of correlators for generating channel impulse responses by correlating the output signals of the demodulators with a training sequence signal;

a hybrid beam selector for calculating first SMNR with respect to the respective channel impulse responses, generating a beam combined output signal by selecting and combining a predetermined number of beam output signals according to magnitudes of the first SMNRs, and performing one of a beam selecting method and a beam combining method by comparing a second SMNR calculated using a channel impulse response of the beam combined output signal with a maximal value of the first SMNRs; and an equalizer for compensating for channel distortion in the output signal of the beam combiner.

13. The digital broadcasting receiving apparatus as recited in claim 12, wherein the hybrid beam selector performs a function a) of calculating SMNRs (mainpath signal to multipath signal and noise ratios) with respect to a plurality of beam output signals, formed according to directions from a plurality of antenna output signals whose phases are shifted depending on arrangement positions of array antennas, by using corresponding channel impulse responses; a function b) of selecting a first predetermined number of beam output signals according to magnitudes of the SMNRs by comparing the calculated SMNRs with respect to the respective beam output signals; a function c) of calculating a delay time between mainpath signals of the selected beam output signals, and generating a combined beam output signal by combining the two beam output signals by using the calculated delay time; a function d) of calculating an SDMR (mainpath signal to dominant multipath signal ratio) with respect to the respective beam output signals when the SMNR of the combined beam output signal is less than the maximal SMNR of the selected beam output signals, and selecting a beam output signal having the greatest SDMR; and a function e) of calculating an SMNR of the combined beam output signal using channel impulse response of the combined beam output signal, and comparing the calculated SMNR with a maximal value among the SMNRs of the selected beam output signals; and a function f) of selecting the combined beam output signal generated in the function c) when the SMNR of the combined beam output signal is greater than or equal to the maximal SMNR of the selected output signals.

14. The digital broadcasting receiving apparatus as recited in claim 13, wherein the function e) includes the functions of:

e1) selecting a predetermined number of beam output signals according to magnitudes of the SMNRs by comparing the calculated SMNRs with respect to the respective beam output signals;

e2) calculating SDMRs with respect to the beam output signals selected in the function e1) by using corresponding channel impulse responses; and e3) comparing the SDMRs calculated in the function e2) and selecting a beam output signal having the greatest SDMR.

15. The digital broadcasting receiving apparatus as recited in claim 14, wherein the SMNRs are calculated under conditions that a signal having the greatest amplitude is considered as a mainpath signal and the remaining signals are considered as multipath signals and noises.

16. The digital broadcasting receiving apparatus as recited in claim 15, wherein the two beam output signals are combined using an equal gain combining (EGC) method or a maximal ratio combining (MRC) method, and the delay time is compensated and added thereto.

* * * * *